(12) United States Patent
Heracleous et al.

(10) Patent No.: US 10,579,575 B2
(45) Date of Patent: Mar. 3, 2020

(54) SYSTEMS AND METHODS OF MANAGEMENT CONSOLE USER INTERFACE PLUGGABILITY

(71) Applicant: Dell Products L.P., Round Rock, TX (US)

(72) Inventors: Stephanos S. Heracleous, Leander, TX (US); Sudhir Vittal Shetty, Cedar Park, TX (US); Nitesh Kumar Anand, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 15/442,329

(22) Filed: Feb. 24, 2017

(65) Prior Publication Data

US 2018/0246837 A1  Aug. 30, 2018

(51) Int. Cl.
*G06F 13/40* (2006.01)
*G06F 9/445* (2018.01)
*G06F 9/451* (2018.01)

(52) U.S. Cl.
CPC ...... *G06F 13/4081* (2013.01); *G06F 9/44526* (2013.01); *G06F 9/451* (2018.02)

(58) Field of Classification Search
CPC .............. G06F 3/12; G06F 15/00; H02H 3/05
See application file for complete search history.

(56) References Cited

U.S. PATENT DOCUMENTS

| | | | | |
|---|---|---|---|---|
| 7,978,351 B2* | 7/2011 | Ishida | ................... | G06F 3/1205 358/1.13 |
| 8,751,959 B2* | 6/2014 | Murata | ................. | G06F 3/0482 715/810 |
| 2002/0067498 A1* | 6/2002 | Chapman | .............. | G06F 3/1204 358/1.13 |
| 2004/0153775 A1* | 8/2004 | Bhattacharjee | .... | G05B 23/0256 714/25 |
| 2005/0223249 A1* | 10/2005 | Samson | ................ | G06F 1/3228 713/320 |
| 2007/0204332 A1* | 8/2007 | Pan | ......................... | G06F 21/31 726/5 |
| 2011/0213934 A1* | 9/2011 | Greenhalgh | .......... | G06F 1/3293 711/146 |
| 2012/0047317 A1* | 2/2012 | Yoon | ..................... | G06F 3/0613 711/103 |
| 2012/0047318 A1* | 2/2012 | Yoon | ..................... | G06F 3/0613 711/103 |
| 2012/0179846 A1* | 7/2012 | Haustein | ................. | G06F 3/061 710/38 |

(Continued)

Primary Examiner — Getente A Yimer
(74) Attorney, Agent, or Firm — Jackson Walker L.L.P.

(57) ABSTRACT

In accordance with embodiments of the present disclosure, an information handling system may include a processor and a memory coupled to the processor, the memory having program instructions stored thereon that, upon execution by the processor, cause the processor to (i) read plug-in configuration data setting forth data regarding user interface modifications to be made to a user interface of a management console application; (ii) based on the plug-in configuration data, call one or more pluggable modules; and (iii) integrate user interface features defined by the plug-in configuration data and the one or more pluggable modules into the user interface of the management console application.

9 Claims, 2 Drawing Sheets

(56) References Cited

U.S. PATENT DOCUMENTS

| | | | |
|---|---|---|---|
| 2012/0206745 A1* | 8/2012 | Shibuya | H04N 1/6033 358/1.9 |
| 2014/0092399 A1* | 4/2014 | Sawada | G06F 3/1208 358/1.2 |
| 2017/0242607 A1* | 8/2017 | Vishne | G06F 3/0625 |

* cited by examiner

SYSTEMS AND METHODS OF MANAGEMENT CONSOLE USER INTERFACE PLUGGABILITY

TECHNICAL FIELD

The present disclosure relates in general to information handling systems, and more particularly to providing pluggability of a management console user interface for multi-chassis management of multiple chassis configured to each receive a plurality of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user who manages a system of multiple information handling system chassis may desire to have a single point of management of the multiple chassis. Such management may typically be performed via a user interface console of a management controller of an information handling system chassis. For example, such management controller may include executable instructions for implementing a web server that outputs interactive user interface elements to a display of a user interface accessible to an administrator, allowing the administrator to monitor the chassis and/or issue management commands to the chassis.

However, developing a browser-based, unified user interface for a systems management solution using disparate development teams has often been problematic due to the absence of a common platform to which development teams can integrate their solutions.

SUMMARY

In accordance with the teachings of the present disclosure, certain disadvantages and problems associated with management of an information handling system chassis have been reduced or eliminated.

In accordance with embodiments of the present disclosure, an information handling system may include a processor and a memory coupled to the processor, the memory having program instructions stored thereon that, upon execution by the processor, cause the processor to (i) read plug-in configuration data setting forth data regarding user interface modifications to be made to a user interface of a management console application; (ii) based on the plug-in configuration data, call one or more pluggable modules; and (iii) integrate user interface features defined by the plug-in configuration data and the one or more pluggable modules into the user interface of the management console application.

In accordance with these and other embodiments of the present disclosure, a method may include reading plug-in configuration data setting forth data regarding user interface modifications to be made to a user interface of a management console application served from an information handling system. The method may also include based on the plug-in configuration data, calling one or more pluggable modules. The method may further include integrating user interface features defined by the plug-in configuration data and the one or more pluggable modules into the user interface of the management console application.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to: (i) read plug-in configuration data setting forth data regarding user interface modifications to be made to a user interface of a management console application served from an information handling system; (ii) based on the plug-in configuration data, call one or more pluggable modules; and (iii) integrate user interface features defined by the plug-in configuration data and the one or more pluggable modules into the user interface of the management console application.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
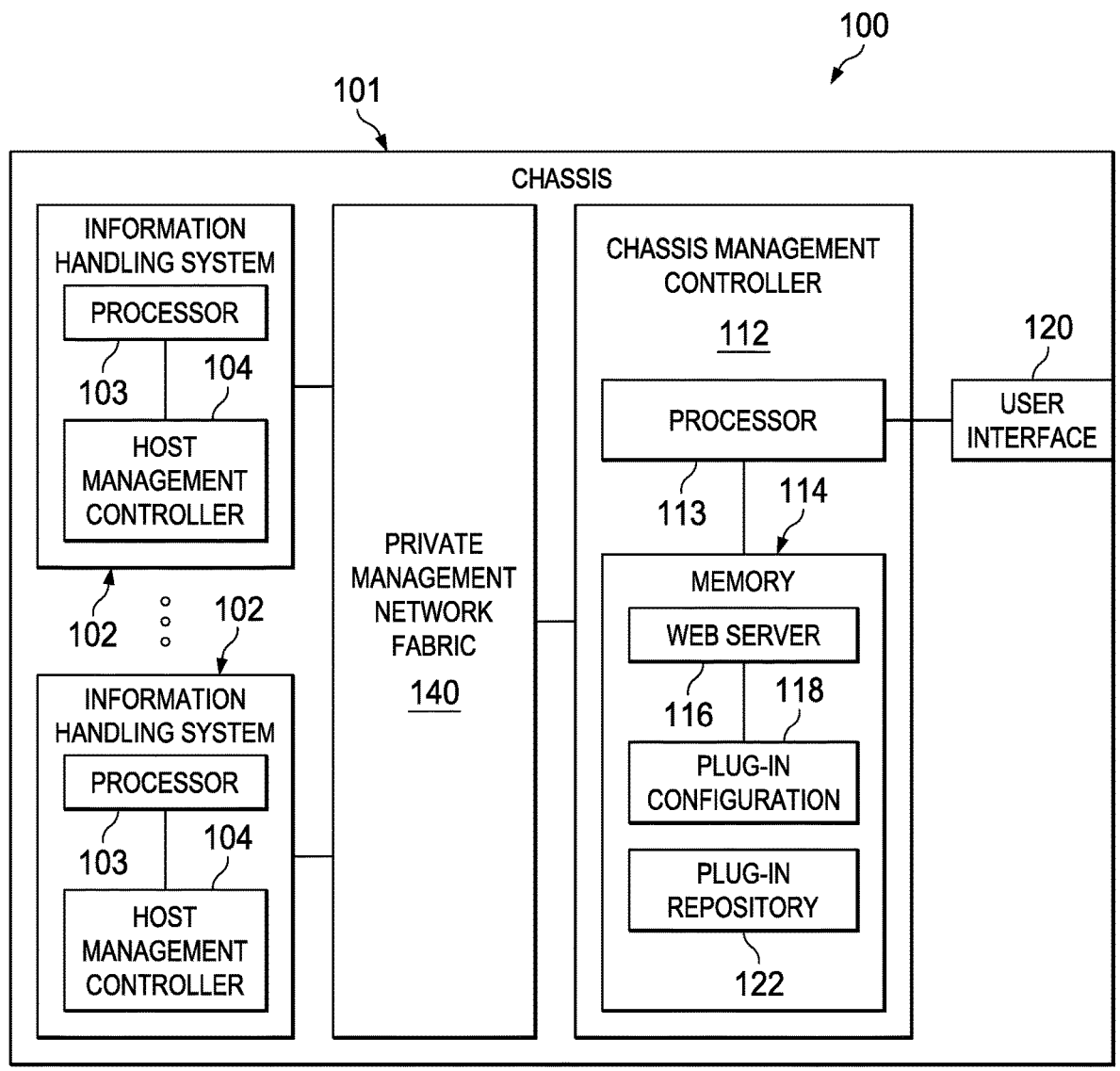
FIG. 1 illustrates a block diagram of an example system chassis with multiple modular information handling systems disposed therein, in accordance with embodiments of the present disclosure.
Figure 2:
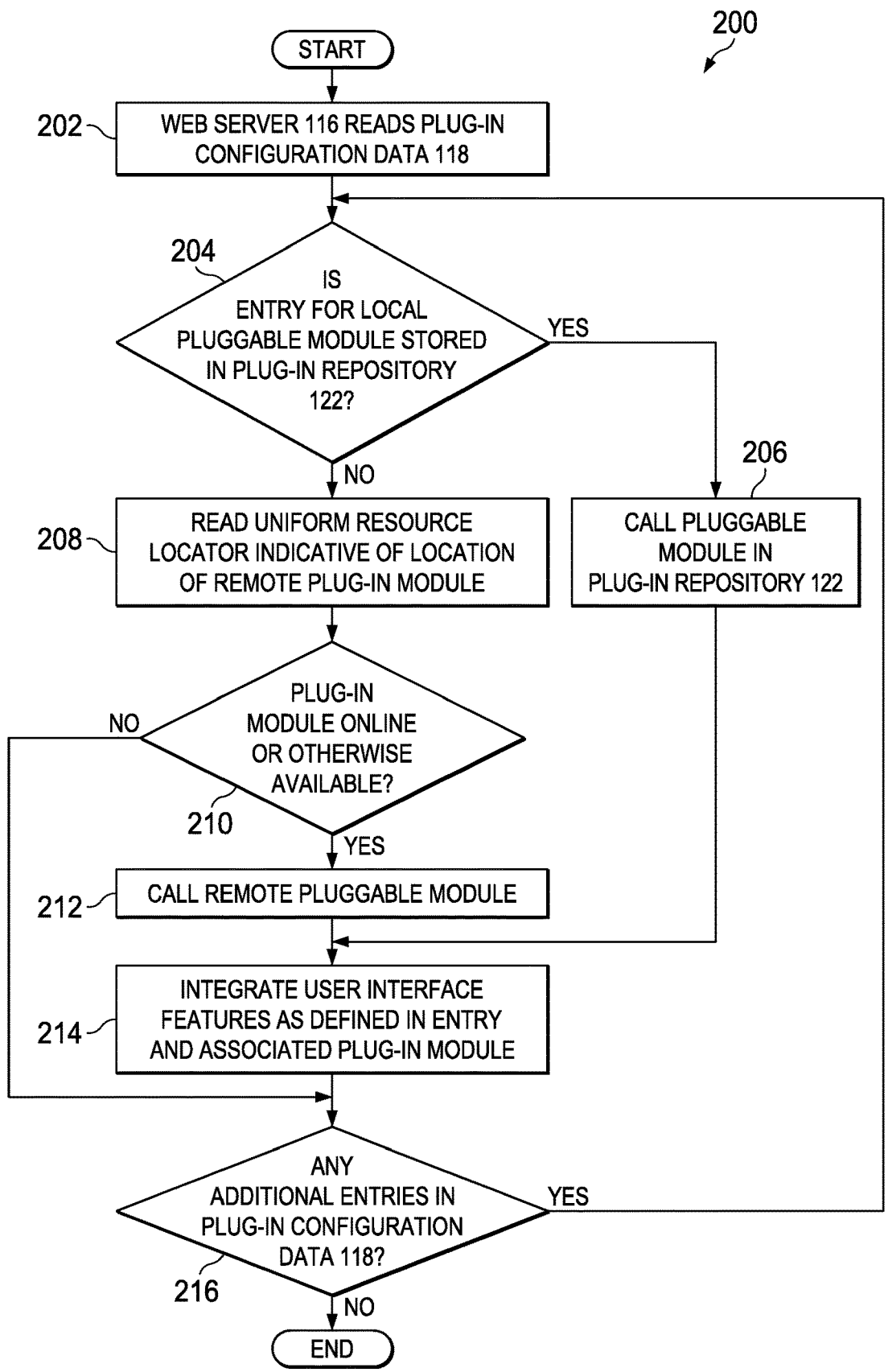
FIG. 2 illustrates a flow chart of an example method of management console user interface pluggability, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a user interface 120, a private management network fabric 140, and a chassis management controller 112. In addition to information handling systems 102, user interface 120, private management network fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC), Dell Remote Access Controller (DRAC) or an Integrated Dell Remote Access Controller (iDRAC).

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Web Services Management ("WS-MAN") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112.

In the same or alternative embodiments, chassis management controller 112 may allow an administrator to remotely manage one or more parameters associated with operation of system 100 and its various information handling resources (e.g., power usage, processor allocation, memory allocation, security privileges, etc.). In some embodiments, chassis management controller 112 may include a management services module.

As shown in FIG. 1, chassis management controller 112 may include a processor 113, and a memory 114. Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or chassis management controller 112 (e.g., memory 114).

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to chassis management controller 112 is turned off. In some embodiments, memory 114 may comprise an M.2 form factor solid state drive.

As shown in FIG. 1, chassis management controller 112 may include a web server 116 and plug-in configuration data 118, and a plug-in repository 122. Web server 116 may comprise a program of executable instructions configured to, when executed by a processor (e.g., a processor internal to chassis management controller 112), store, process and deliver web pages to user interface 120. In some embodiments, web server 116 may be a special-purpose web server including dedicated functionality relating to management of chassis 101.

Plug-in configuration data 118 may include any number of databases, lists, tables, maps, and/or other suitable data structures configured to set forth identifying and/or other information regarding pluggable modules that may modify a default operation of web server 116, as described in greater detail below.

Plug-in repository 122 may comprise one or more pluggable modules which include user interface information for modifying a default operation of web server 116. For example, a pluggable module may include user interface information and/or executable code that may add, remove, or modify existing user interface pages which are accessible from a navigation menu of web server 116. As another example, a pluggable module may include user interface information and/or executable code that may add, remove, or modify individual management widgets that are hosted on a particular user interface page. As a further example, a pluggable module may include user interface information and/or executable code that may personalize the user interface elements displayed to user interface 120 (e.g., personalize such user interface elements for a particular product and/or user).

In operation, web server 116 may be configured to determine the existence of plug-in configuration data 118, read such plug-in configuration data 118, and based on the plug-in configuration data 118, retrieve pluggable modules from either of plug-in repository 122 or remotely from a remote location (not explicitly shown in FIG. 1) communicatively coupled to chassis 101 via a network (not explicitly shown in FIG. 1). Such modules may execute and interact with web server 116 so as to modify the user interface rendered by web server 116 in accordance with user interface elements and/or instructions set forth in such pluggable modules.

Accordingly, the systems and methods herein may provide an ability for development teams to use an existing platform (e.g., web server 116) to manage the retrieval and persistence of data and also develop pluggable modules to develop a particular set of unique user interface pages. Thus, user functionality may be extended without modifying an existing software stack if a chassis management controller and existing systems management functionality may be enhanced at the user interface level in a seamless fashion. Thus, the systems and methods herein allow for an ability to have an identical and unified way of system management despite the fact that data and development may be originated from a diverse set of management development teams.

User interface 120 may comprise any instrumentality or collection of instrumentalities configured to communicate information to and/or receive information from a human user. For example, in some embodiments, user interface 120 may comprise a keyboard-video-mouse device communicatively coupled to chassis management controller 112 in order to manipulate or control the functionality of chassis management controller 112. As another example, in these and other embodiments, user interface 120 may comprise an interactive liquid crystal display screen (or similar device) communicatively coupled to chassis management controller 112 in order to manipulate or control the functionality of chassis management controller 112. As a further example, although user interface 120 is shown in FIG. 1 as being integral to chassis 101, in some embodiments, user interface 120 may be integral to a remote console that is coupled to chassis 101 via the Internet or another communications network, thus allowing an administrator to manage chassis 101 without physical proximity to chassis 101.

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

FIG. 2 illustrates a flow chart of an example method 200 of management console user interface pluggability, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, upon boot of chassis management controller 112 or other initialization of web server 116, web server 116 may read plug-in configuration data 118. At step 204, for an entry in plug-in configuration data 118, web server 116 may determine if the entry is for a local pluggable module stored in plug-in repository 122 or a remote pluggable module stored at a location remote from chassis 101. If the entry is for a local pluggable module stored in plug-in repository 122, method 200 may proceed to step 206.

Otherwise, if the entry is for a remote pluggable module stored at a location remote from chassis 101, method 200 may proceed to step 208.

At step 206, in response to an entry in plug-in configuration data 118 for a local pluggable module stored in plug-in repository 122, web server 116 may call the pluggable module in plug-in repository 122. In some embodiments, the entry of plug-in configuration data 118 may include an application programming interface (API) call and the pluggable module from plug-in repository 122 may include the API for executing the call. After completion of step 206, method 200 may proceed to step 214.

At step 208, in response to an entry in plug-in configuration data 118 for a remote pluggable module stored at a location remote from chassis 101, web server 116 may read a uniform resource locator (URL) from the entry indicative of a location of the remote plug-in module. At step 210, web server 116 may determine if the plug-in module is online or otherwise available. If the plug-in module is offline or otherwise unavailable, method 200 may proceed to step 216. Otherwise, if the plug-in module is online or otherwise available, method 200 may proceed to step 212.

At step 212, in response to the plug-in module being online or otherwise available, web server 116 may call the remote pluggable module. In some embodiments, the entry of plug-in configuration data 118 may include an application programming interface (API) call and the remote pluggable module may include the API for executing the call.

At step 214, web server 116 may integrate user interface features as defined in the entry from plug-in configuration data 118 and its associated plug-in module.

At step 216, web server 116 may determine if any additional entries are present in plug-in configuration data 118. If additional entries are present, method 200 may proceed again to step 204. Otherwise, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a memory coupled to the processor, the memory having program instructions stored thereon that, upon execution by the processor, are configured to cause the processor to:
read plug-in configuration data setting forth data regarding user interface modifications to be made to a user interface of a management console application;
based on the plug-in configuration data, call one or more pluggable modules configured to modify a default operation of a web server that is configured to provide access to the management console application, wherein at least one of the pluqqable modules is stored locally to the information handling system and another at least one of the pluqqable modules is stored remotely; and
integrate user interface features defined by the plug-in configuration data and the one or more pluggable modules into the user interface of the management console application, wherein the integrating includes at least one of adding, removing, or modifying a management widget with respect to the user interface.

2. The information handling system of claim 1, wherein the one or more pluggable modules comprise application programming interfaces for modifying user interface features as set forth in the plug-in configuration data.

3. A method comprising:
reading plug-in configuration data setting forth data regarding user interface modifications to be made to a user interface of a management console application served from an information handling system;
based on the plug-in configuration data, calling one or more pluggable modules to modify a default operation of a web server that provides access to the management console application, wherein at least one of the pluqqable modules is stored locally to the information handling system and another at least one of the pluqqable modules is stored remotely; and
integrating user interface features defined by the plug-in configuration data and the one or more pluggable modules into the user interface of the management console application, wherein the integrating includes at least one of adding, removing, or modifying a management widget with respect to the user interface.

4. The method of claim 3, wherein the one or more pluggable modules comprise application programming interfaces for modifying user interface features as set forth in the plug-in configuration data.

5. An article of manufacture comprising:
a non-transitory computer readable medium; and
computer-executable instructions carried on the computer readable medium, the instructions readable by a processor, the instructions, when read and executed, for causing the processor to:
   read plug-in configuration data setting forth data regarding user interface modifications to be made to a user interface of a management console application served from an information handling system;
   based on the plug-in configuration data, call one or more pluggable modules configured to modify a default operation of a web server that is configured to provide access to the management console application, wherein at least one of the pluqqable modules is stored locally to the information handling system and another at least one of the pluqqable modules is stored remotely; and
   integrate user interface features defined by the plug-in configuration data and the one or more pluggable modules into the user interface of the management console application, wherein the integrating includes at least one of adding, removing, or modifying a management widget with respect to the user interface.

6. The article of claim 5, wherein the one or more pluggable modules comprise application programming interfaces for modifying user interface features as set forth in the plug-in configuration data.

7. The information handling system of claim 1, wherein the web server is implemented at a chassis management controller management console application is web-based.

8. The method of claim 3, wherein the web server is implemented at a chassis management controller.

9. The article of claim 5, wherein the web server is implemented at a chassis management controller.

* * * * *